Dec. 29, 1970    TOSHIO YAMASAKA ET AL    3,551,022
OPTICAL STAND
Filed Jan. 27, 1969    2 Sheets-Sheet 1
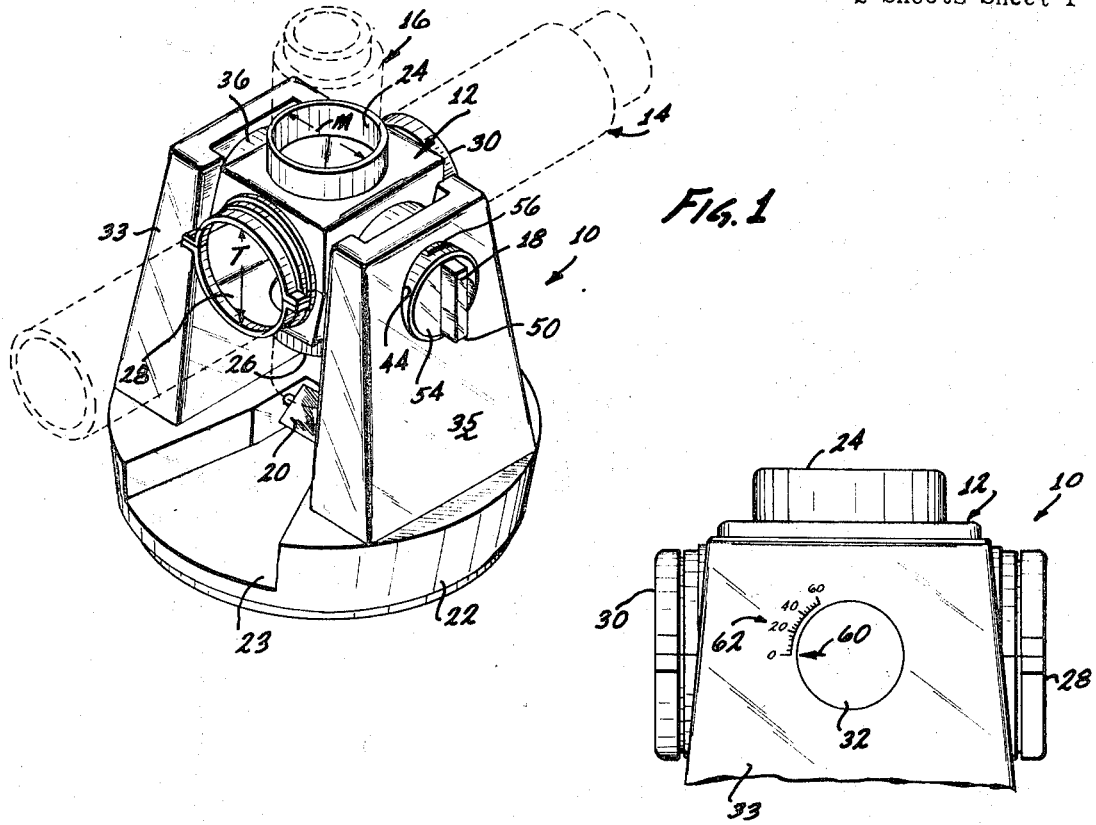
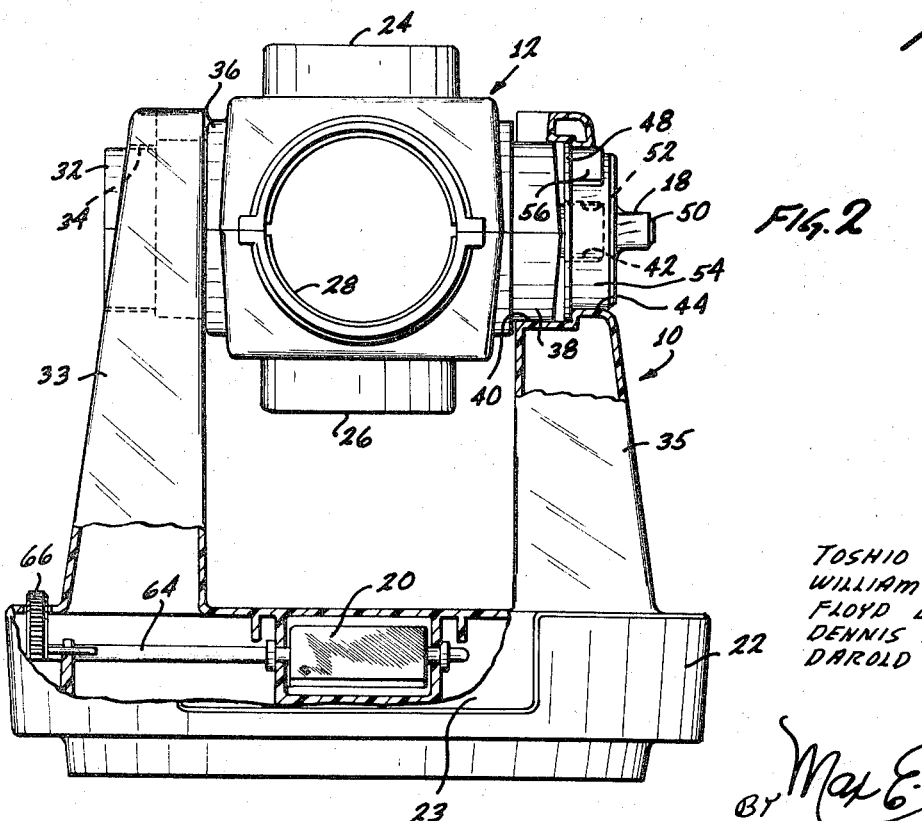
INVENTORS
TOSHIO YAMASAKI
WILLIAM R. BAYNES
FLOYD E. SCHLAU
DENNIS H. MERINO
DAROLD M. SHIRWO
BY Max E. Shirk
ATTORNEY Dec. 29, 1970  TOSHIO YAMASAKA ET AL  3,551,022
OPTICAL STAND Filed Jan. 27, 1939  2 Sheets-Sheet 2

INVENTORS
TOSHIO YAMASAKI
WILLIAM R. BAYNES
FLOYD E. SCHLAU
DENNIS H. MERINO
DAROLD M. SHIRWO

BY Max E. Shirk
ATTORNEY

United States Patent Office 3,551,022
Patented Dec. 29, 1970

3,551,022
OPTICAL STAND
Toshio Yamasaki, Gardena, William R. Baynes and Floyd E. Schlau, Palos Verdes Peninsula, Dennis H. Merino, Harbor City, and Darold M. Shirwo, Beverly Hills, Calif., assignors to Mattel, Inc., Hawthorne, Calif., a corporation of Delaware
Filed Jan. 27, 1969, Ser. No. 793,983
Int. Cl. G02b 21/00, 21/24
U.S. Cl. 350—85                                  2 Claims

ABSTRACT OF THE DISCLOSURE

A dual optical instrument stand for holding a telescope or microscope comprising a mount with trunnions pivotally supported on a frame, the mount having two sets of apertures for receiving the tube of either optical instrument. A locking knob on the frame can be turned to force a mount trunnion hard against a support bearing on the frame, which locks the mount at a desired position.

BACKGROUND OF THE INVENTION

Field of the invention

This invention relates to stands for optical instruments.

Description of the prior art

Children are often first exposed to both telescopes and microscopes within a short period of time. Both of these instruments require stands of the same general type, which can hold a tube-enclosed optical system and clamp it at a particular position. An optical stand which was simple, yet which held an instrument steady while permitting easy adjustment and reclamping at a new position would find considerable use, particularly if a simple stand could serve to hold both a telescope and a microscope.

OBJECTS AND SUMMARY OF THE INVENTION

An object of the present invention is to provide a simple and economical stand for optical instruments.

Another object is to provide a stand which can hold either a telescope or a microscope.

In accordance with the present invention, a simple optical stand is provided which can be easily adjusted to a desired position and clamped in place. In one embodiment of the invention, the stand comprises a mount with two sets of apertures for holding a telescope or microscope. The mount is held on a frame which has an adjustable mirror for reflecting light to a microscope, and which has declination markings for indicating the position of a telescope. A knob on the frame has a cam which clamps the mount at any position without tending to rotate it, by applying force to a small diameter stub on the mount, to press a mount-supporting trunnion against the walls of a frame bearing which supports it.

In another embodiment of the invention, a telescope-holding mount is held on a tripod by a ball-and-socket joint which is easily clamped at a desired position. A ball on the mount extends through a retainer and into a socket on the tripod, the socket having a pair of flanges that can be squeezed together to hold the ball at a desired position. The retainer has an elliptical aperture whose walls surround the flanges. The retainer can be turned so that the walls of the elliptical aperture draw the flanges together and thereby cause the flanges to tightly grasp the ball.

The novel features of the invention are set forth with particularity in the appended claims. The invention will be best understood from the following description when read in conjunction wtih the accompanying drawings.

BRIEF DESCRIPTION OF THE DRAWINGS

FIG. 1 is a perspective view of an optical instrument stand constructed in accordance with one embodiment of the invention;

FIG. 2 is a front elevation view of the stand of FIG. 1;

FIG. 4 is a partial side elevation view of the stand of FIG. 1;

DESCRIPTION OF THE PREFERRED EMBODIMENTS

Figure 3:
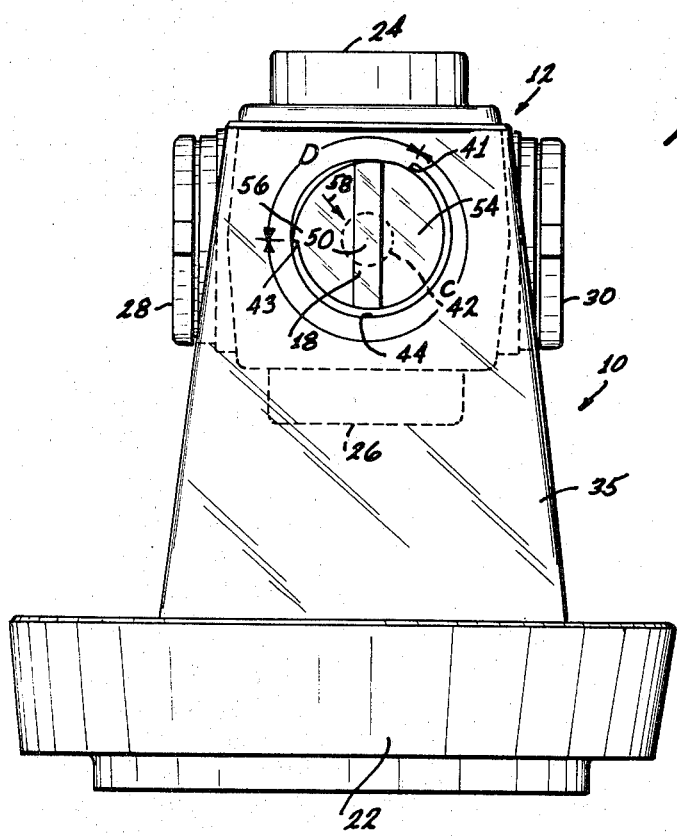
FIG. 3 is a side elevation view of the stand of FIG. 1.

FIG. 1 illustrates an optic stand comprising a frame 10 which supports a mount 12. The mount is adapted to hold either a telescope, indicated at 14, or a microscope indicated at 16, of predetermined major tube sizes. Inasmuch as the diameter T of the telescope tube is larger than the diameter M of the microscope tube, the mount has separate apertures or ports for receiving the two instruments. The axes of the pairs of ports for the instruments are spaced about 90° from each other about the mount. The mount 12 is pivotally mounted on the frame 10, and a locking knob 18 is provided to enable the mount to be clamped at any position to which it has been pivoted.

In order to facilitate use of the stand to hold a microscope, a mirror 20 is provided in the base 22 of the frame, to reflect light to a microscope. The base has a depressed portion 23 extending outwardly from the mirror position to prevent obstruction of light to the mirror. When a microscope 16 is to be used, it is inserted through apertures 24 and 26 in the mount, and the mount is adjusted so that the microscope points at the mirror 20. When a telescope 14 is to be used, the microscope is removed and the telescope tube is inserted through apertures 28 and 30 in the mount. The walls of the apertures are constructed of compressible material in order to assure firm support of an optical instrument tube. Particularly in the use of a telescope, the mount may have to be turned to enable the telescope to point at different elevations. This requires loosening the knob 18, changing the elevation of the telescope, and retightening the knob. The entire frame 10 may be mounted on a tripod or other support (not shown) for swiveling around a vertical axis, where desired, to enable the telescope to be turned to point at different azimuths.

FIG. 2 shows the manner in which the mount 12 is held by the frame. The frame has right and left side walls 33 and 35 that extend upwardly from the base 22. The mount, which is in the form of a thin shell, has a right side trunnion 32. The trunnion 32 is engaged with a frame bearing 34 on the right frame wall for rotatable mounting thereon. An enlarged portion 36 on the right side of the mount, serves as a thrust bearing that bears against the frame. The mount also has a left trunnion 38 which is engaged with a bearing 40 at the left side of the frame, for rotatable mounting thereon. A small diameter stub 42 projects from the left side of the mount.

The locking knob 18 projects through an aperture 44 in the frame. The knob has a flange 48 that engages the walls surrounding the aperture 44 to hold the knob in place. A protuberance 50 on the outside of the knob aids in turning it. The knob has a central bearing portion 52 which receives the stub 42 on the mount for relative rotation between them. A shaft-like knob portion 54 is held in the frame aperture 44, the shaft-like portion having a cam portion 56 thereon. As will be explained below, turning of the knob 18 causes the cam portion 56 thereon to push down the knob so that it, in turn, pushes down on the stub 42. This causes the mount trunnion 38 to be pressed hard against the bottom of the frame bearing 40. The resulting friction between the trunnion 38 and bearing 40 locks the mount in position.

The shape of the locking knob 18 and frame bearing 44 are shown in FIG. 3. The frame aperture 44 has a portion C which is circular and of constant distance from the axis of the left side mount trunnion 38. The frame aperture also includes a portion D which varies in distance from the axis of the left side mount trunnion 38. When the knob protuberance 50 is turned clockwise, the cam portion 56 is pushed in the direction of arrow 58. The aperture formed by the frame bearing 44 is large enough to allow the knob to move a substantial distance in the direction of arrow 58, so the knob does not bind in the bearing. However, the knob pushes the stub 42 of the mount trunnion in the direction of arrow 58, thereby causing the mount trunnion 38 to be pressed hard against the frame bearing 40. The resulting high friction between the mount trunnion 38 and frame bearing 40 causes the mount to be fixed in position.

The coefficient of friction between the knob bearing portion 52 and trunnion stub 42 is approximately the same as the coefficient between the mount trunnion 38 and the frame bearing 40. Thus, as the knob 18 is turned to clamp the mount in position, the knob tends to turn the mount while the frame bearing 40 tends to hold the mount against turning. The small diameter of the stub 42, where the knob applies force to the mount, as compared to the diameter of the trunnion 38, results in only a relatively small turning moment being applied to the mount. Accordingly, the mount generally does not rotate as the locking knob is turned. This enables quick clamping of the mount at any position to which it has been oriented, without a slight shift during clamping. In addition, if the mount 12 is turned to point an optical instrument in another direction, there is no tendency to rotate the locking knob and thereby cause undesired locking of the mount. In order to assure that no turning will occur, the stub 42 preferably has a diameter less than half that of the trunnion 38. Rotation of the knob in a counterclockwise direction, to loosen the mount, is limited by ledges 41 and 43 on the frame and knob, respectively. Both ledges face almost completely in a circumferential direction, although they can be oriented to face only partially circumferentially.

When using the mount to hold a telescope for viewing the heavens, it is often desirable to provide an indication of the elevation of the telescope tube. This can aid in locating particular stars or other heavenly bodies, As shown in FIG. 4, a mark 60 is placed on the right trunnion 32, and angular markings 62 are placed about the trunnion to indicate the elevation of the telescope.

As mentioned above, the mirror 20 is helpful for illumination when using the mount to hold a microscope. FIG. 2 shows the apparatus for holding the mirror 20, including a shaft 64 that is rotatably mounted on the frame to enable the mirror to be turned for best illumination. A wheel 66 which partially projects from the frame base enables hand turning of the mirror.

Figure 6:
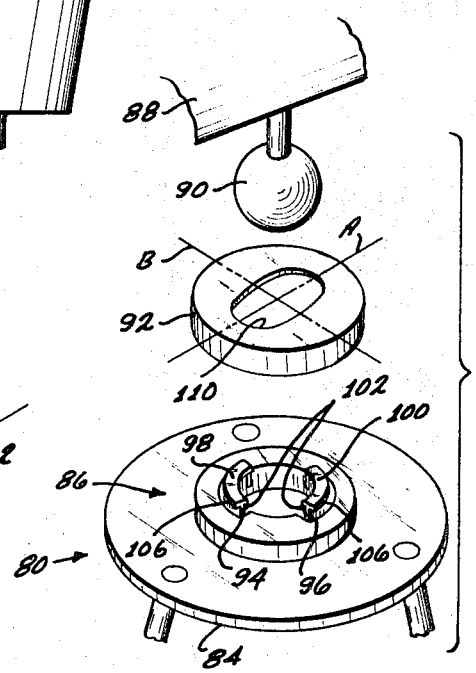
FIG. 6 is an exploded perspective view of the stand of FIG. 5.
Figure 5:
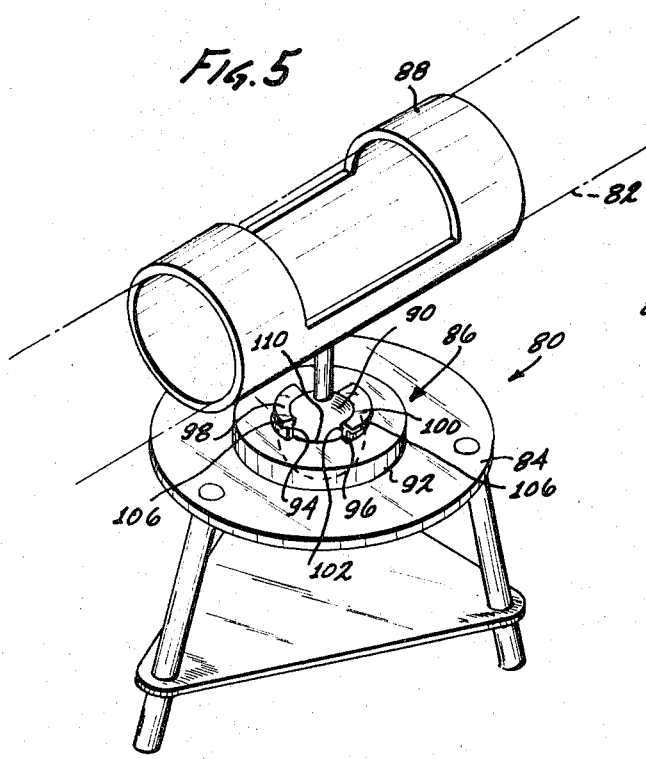
FIG. 5 is a perspective view of an optical instrument stand constructed in accordance with another embodiment of the invention.

FIGS. 5 and 6 illustrate another optical stand 80 which is especially useful for holding a telescope 82. The stand comprises a tripod frame 84 with a socket bearing 86. A mount 88 for holding the telescope has a ball-type bearing 90 which is held in the socket bearing. A retainer 92 which is disposed about the ball and socket, holds the socket closed tight around the ball 90 to clamp it at any desired position.

The socket bearing 86 comprises a ring-shaped member with two brackets 94 and 96 formed thereon in a manner that permits them to bend toward and away from each other. The brackets have upper portions 98, 100 with ball-engaging sides 102 that extend toward each other to help in capturing the ball 90 and lips 106 that extend outwardly for engaging the retainer. The retainer 92 has an elliptical aperture 110 which is wide enough at even its minor axis to permit the ball 90 to pass therethrough. The walls of the aperture 110 engage the brackets 94 and 96, and can move them together to clamp the ball 90 tightly in place.

The mount is assembled by inserting the ball 90 through the retainer 92 and into the socket bearing 86. The retainer 92 is pushed over the upper portions 98, 100, of the brackets, while the retainer aperture 110 is oriented with its major axis A extending between the brackets. The ball 90 is then held loosely, and the mount can be easily turned to point the telescope in any direction. The retainer then may be turned, which causes the walls of the aperture 110 to press the flanges 94 and 96 closer together. Before the retainer can be turned sufficiently for the minor axis B of the elliptical aperture to extend between the flanges, the ball-engaging sides 102 of the flanges clamp the ball tightly in place. The outwardly extending lips 106 of the flanges keep the retainer in place. The stand is simple and easy to operate, generally requiring only about an eighth of a full turn to unlock the mount so it can be turned and then locked in a new position.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An optical instrument stand comprising:
   a frame having spaced portions provided with aligned trunnion bearings;
   an instrument mount between said spaced portions and having aligned trunnions journalled in said trunnion bearings, said instrument mount comprising a body having a pair of openings of different diameters therethrough extending normal to the axes of said trunnions and angularly displaced from each other, about said axes, about ninety degrees whereby to selectively support a telescope or a microscope;
   a cylindrical stub extending axially outwardly from an end of one of said trunnions, concentric thereto and of less diameter; and
   a locking member journalled on said stub for rotation relative to said stub and said frame, said locking member having a peripheral cam portion having a radially facing surface cooperable with the corresponding frame portion for forcing said member, stub and one trunnion radially to thereby frictionally lock said one trunnion against rotation in its bearing when said member is rotated to a predetermined position relative to said frame portion.

2. An optical instrument stand as defined in claim 1 wherein said frame is provided with a surface, between said spaced portions, defining a microscope stage; and adjustable mirror means on said frame adjacent said surface.

References Cited

UNITED STATES PATENTS

| 1,107,811 | 8/1914 | Lucas | 248—207 |
| 2,048,440 | 7/1936 | Fassin | 350—85 |
| 2,524,473 | 10/1950 | Pasturczak | 248—183 |
| 2,756,957 | 7/1956 | Rader | 248—185 |
| 1,128,761 | 2/1915 | Cornell | 350—84X |
| 2,711,589 | 6/1955 | Stock | 350—83X |
| 3,112,570 | 12/1963 | Vasconcellos | 350—84X |

PAUL R. GILLIAM, Primary Examiner

U.S. Cl. X.R.

350—18